United States Patent Office 3,387,885
Patented June 11, 1968

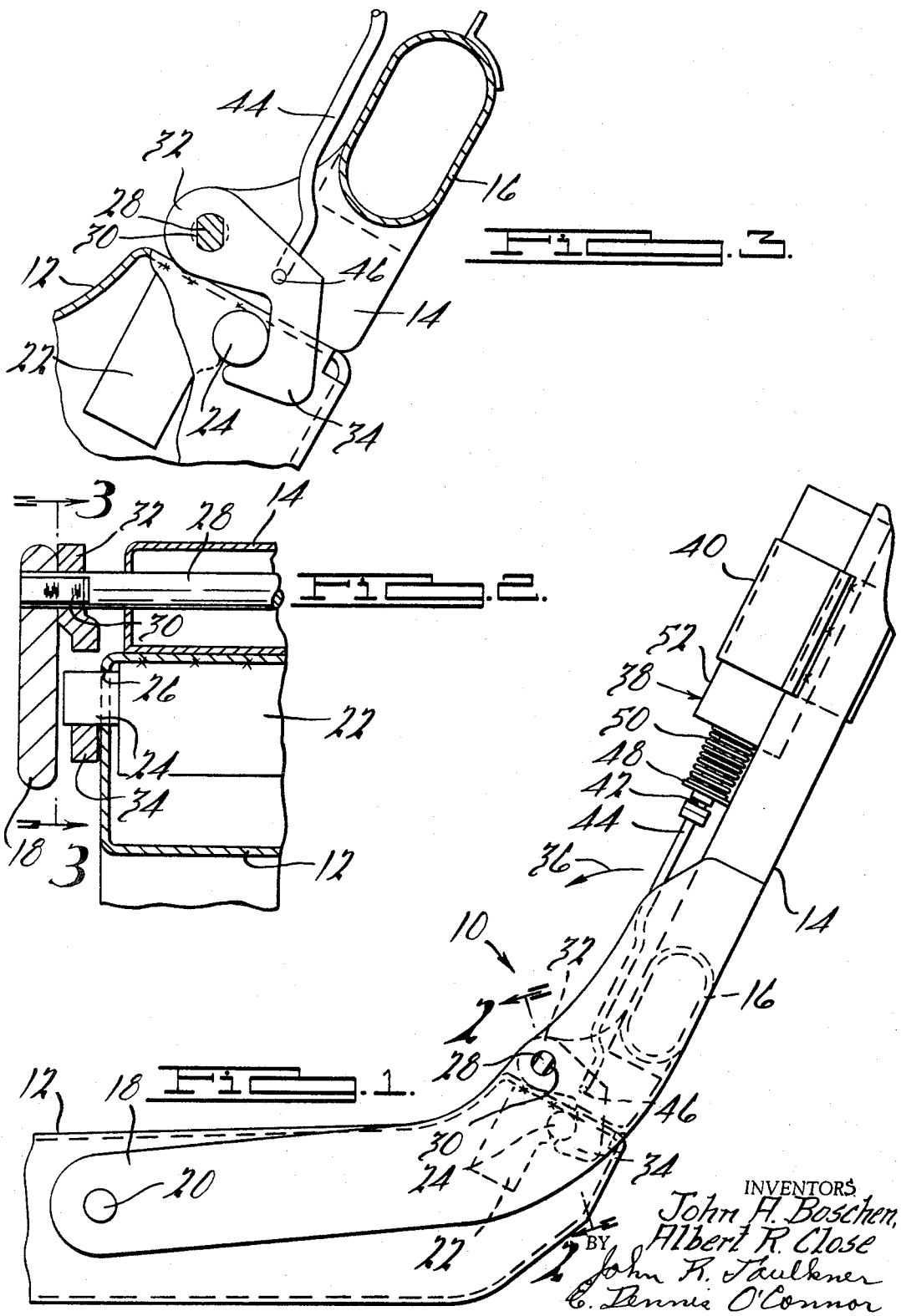

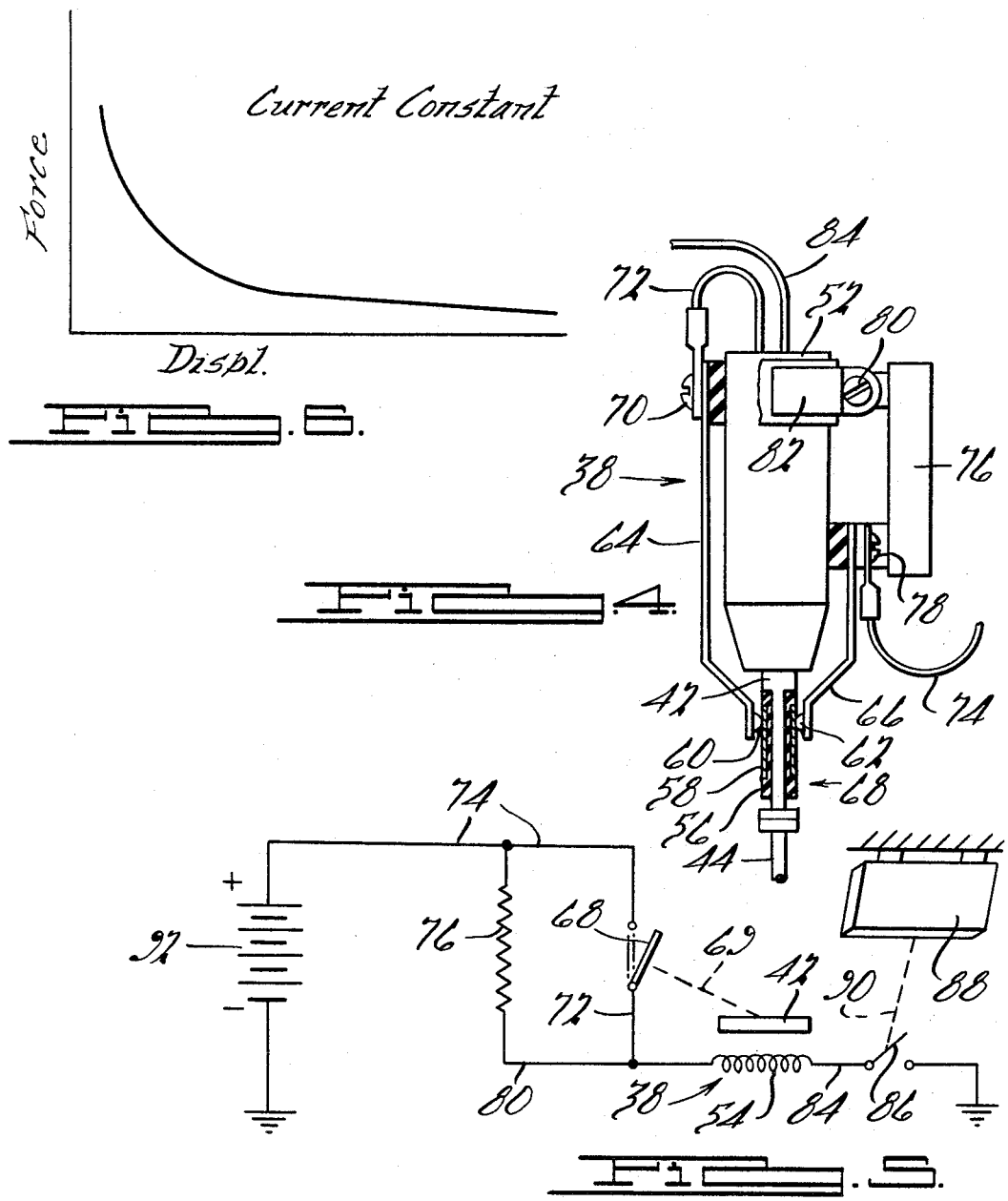

3,387,885
SEAT BACK LATCH MECHANISM
John A. Boschen, Royal Oak, and Albert R. Close, Oak Park, Mich., assignors to Ford Motor Company, Dearborn, Mich., a corporation of Delaware
Filed Apr. 20, 1967, Ser. No. 632,419
9 Claims. (Cl. 297—379)

ABSTRACT OF THE DISCLOSURE

A latch mechanism for preventing movement of a pivotally mounted vehicle seat back member relative to the horizontal seat member. Cooperating latch elements are mounted on each of the seat members and are spring biased into latching engagement. Motor means, energized when a vehicle door is opened, exerts a force overcoming the spring bias and unlatching the latch elements. The electrical circuitry allows the use of an intermittent duty solenoid as the motor means for holding the latch elements open for extended periods of time.

Background of the invention

The prior art, typified by U.S. Patent 2,559,548, issued July 3, 1951, teaches the use of a releasable latch mechanism for holding the pivoted or folding seat back of certain motor vehicles seat assemblies, such as those utilized in two door models, against movement relative to the horizontal seat member. Obviously, such an arrangement contributes to the safety of vehicle passengers carried by the seat assembly as well as rear seat passengers during vehicle accident or so-called "panic stop" conditions. Manually operable control means conventionally are provided for releasing the latch mechanism to permit forward tilting of the seat back when ingress or egress of rear seat passengers is desired. Such control means may prove bothersome and cumbersome to operate.

This invention provides a latch mechanism including motor means that is energized automatically when a vehicle door is open and that exerts a force causing latching elements to disengage, thus permitting seat back movement without the performance of a manual task. Reduction of cost for such a mechanism has been achieved by the use of a motor energizing circuit that allows the motor means to comprise an intermittent duty solenoid, despite the extended periods of motor operation required.

Summary of the invention

A seat back latch mechanism constructed in accordance with this invention is adapted for use in a motor vehicle body having a passenger compartment, a body opening permitting access to said compartment, a door for said body opening having an open position and a closed position and a seat assembly mounted in said compartment and including a substantially horizontal seat member and a seat back member pivotally secured to said seat member. The latch mechanism includes cooperating latch means on the seat members having an unlatched position permitting movement of the seat back and a latched position wherein the seat members are locked against relative movement. Resilient means are operatively connected to the latch means and exert a force urging the latter into latched position. Motor means comprising an intermittent duty solenoid are operatively connected to the latch means for exerting a force overcoming the force of the resilient means and urging the latch means into the unlatched position. Door position sensitive control means connect the solenoid to a source of electrical energy and energize the solenoid only when the door is in the open position. The control means include circuit means that apply initially a first current to the solenoid and subsequently a lesser current after a predetermined period of solenoid operation.

Description of the drawings

FIGURE 1 is a side elevation view, having parts cut away, of a portion of a vehicle seat assembly including a latch mechanism constructed in accordance with this invention;

FIGURE 2 is a partial sectional view taken along the line 2—2 of FIGURE 1;

FIGURE 3 is a sectional view taken along the line 3—3 of FIGURE 2;

FIGURE 4 is an enlarged elevation view, partially in section, of the solenoid included in the latch mechanism of FIGURE 1;

FIGURE 5 is a circuit diagram of the electrical circuitry utilized by this invention and includes schematic illustrations of mechanical couplings between mechanical elements and circuit elements; and FIGURE 6 is a plot of the relationship between the force exerted by the solenoid of FIGURE 4 and solenoid plunger displacement with applied current constant.

Detailed description of the invention

Referring now in detail to the drawings and in particular to FIGURES 1-3, the numeral 10 denotes a vehicle seat assembly. It is to be understood that the seat assembly is symmetrical although only one side thereof is illustrated. Assembly 10 includes a substantially horizontal seat cushion frame member 12 and a seat back cushion frame member 14 having a lower cross tube 16. A conventional exterior attaching and support member or "hockey stick" 18 is secured by welding or other suitable joining techniques to seat back member 14 for movement therewith. Hockey stick 18 also is pivotally secured to seat member 12 at 20. A support block 22 is secured to the interior surface of seat member 12 and includes an integrally formed pin 24 extending through an aperture 26 formed through a side wall of seat member 12.

Journalled through seat back member 14 and hockey stick 18 is a rotatable shaft 28 having a machine flat portion 30 proximate its outer extremity. A latch member 32, having a hooked extension 34, is snugly fitted on shaft 28 for unitary rotation therewith. It may be seen that latch member 32 is constructed and arranged relative to pin 24 so that hooked extension 34 engages the pin when latch member 32 is rotated in a clockwise direction as viewed in FIGURES 1 and 3. Pin 24 and latch member 32 thus cooperate to form a latch capable of securing seat back member 14 against movement relative to seat member 12 in the direction illustrated by arrow 36 of FIGURE 1.

An intermittent duty solenoid 38 is secured to seat back member 14 by a bracket 40. Plunger 42 of solenoid 38 is threadably secured to one end of a control rod 44. The end of rod 44 remote from plunger 42 is secured to latch member 32 at 46. A washer 48 is secured to plunger 42. A compression spring 50 surrounds plunger 42 and bears on washer 48 and housing 52 of solenoid 38 and exerts a force acting through plunger 42 and rod 44 biasing latch member 32 into the latched position illustrated. In this position solenoid 38 is not energized and plunger 42 is in an extended position from housing 52.

FIGURES 4 and 5 illustrate the details of the construction of solenoid 38 and the energizing and control circuit associated therewith. Plunger 42 is slidably received by housing 52 and is proximate to a coil 54. Plunger 42 mounts a sleeve 56 of insulating material that, in turn, mounts about its midpoint a conductive sleeve 58. A pair of conductive contacts 60 and 62 are carried by conductive spring arms 64 and 66, respectively, and are positioned in intimate contact with the assembly carried by plunger 42. Sleeves 56 and 58 cooperate with contacts 60 and 62 and arms 64 and 66 to form a switch 68. (The mechanical relationship between the position of plunger 42 and the condition of switch 68 is schematically illustrated in FIGURE 5 by dotted line 69 and will be described in detail below.)

The end of arm 64 remote from contact 60 is electrically connected by a fastener 70 to a conductor 72 that is connected to one end of coil 54. The end of arm 66 remote from contact 62 is electrically connected to a conductor 74 and to one end of an electrical resistance 76 by a fastener 78. The other end of resistance 76 is electrically connected by a fastener 80 to a conductor 82 that is connected to coil 54. The end of coil 54 remote from conductor 72 is connected by a conductor 84 to a switch 86.

Switch 86 is the conventionally utilized, door position sensitive, interior light switch of a motor vehicle that is closed when the vehicle door is open and open when the vehicle door is closed. The mechanical relationship between switch 86 and a vehicle door 88 is illustrated schematically (FIGURE 5) by the dotted line 90.

From FIGURE 5 and the above description it may be seen that this circuit arrangement enables a source of electrical energy 92, coil 54 and switch 86 to be electrically connected in series circuit. Switch 68 is in series circuit with source 92 and coil 54 between the source and coil. Resistance 76 also is in series circuit with source 92 and coil 54 between the source and coil and is in parallel circuit with switch 68. The significance of this arrangement will be explained in detail below.

In practice, the following circuit elements have been found satisfactory:

Energy source 90—12 volt automotive battery
Resistance 76—8 ohms
Solenoid 38—12 volt intermittent duty attractive type FIGURE 6 illustrates the principle upon which the operation of the circuit of FIGURE 5 is based. This graph, wherein the ordinate is the magnetic force exerted on an attractive type solenoid plunger and the abscissa is the displacement of the plunger out of the space defined by the coil windings, illustrates that when constant current is supplied to the coil and the plunger is attracted by a magnetic force field into the solenoid housing, the force increases substantially hyperbolically.

This principle is applied to the device of this invention as follows. It is desired, upon energization of solenoid 38, that a force be exerted, from plunger 42 through rod 44, that overcomes the force of spring 50 and causes counterclockwise rotation of latch member 32 (viewed in FIGURES 1 and 3) so that hooked extension 34 disengages pin 24. Disengagement must, of course, be maintained for extended periods of time. Use of a continuous duty solenoid is undesirable, however, due to packaging and cost considerations. It was discovered that since a constant force is required to maintain disengagement, an intermittent solenoid could be employed if initial full current application to the solenoid is discontinued after the plunger 42 moves partially into the housing 52 and is replaced by a current of lesser magnitude, insufficient to harm the solenoid but sufficient to maintain disengagement. That this is accomplished by this invention may be seen from a description of the operation of the device.

During operation of the vehicle all parts included in FIGURES 1–4 are as illustrated. Since door 88 is closed, switch 86 is open as is the circuit of FIGURE 5. Plunger 42 is extended, as illustrated, and a conductive path is continuous from contact 62 to contact 60 through conductive sleeve 58 so that switch 68 is closed as shown in phantom in FIGURE 5. When door 88 is opened, switch 86 closes and current flows from energy source 92 through conductor 74, switch 68 and conductor 72 to coil 54, thereby energizing solenoid 38 to exert a force overcoming the force of spring 50 and causing a displacement of plunger 42, rod 44 and latch member 32 that thus disengages pin 24. Almost immediately, plunger 42 will be displaced a distance sufficient to bring insulating sleeve 56 between contacts 60 and 62 resulting in the opening of switch 68. Current from energy source 92 passes at this time through resistance 76 and conductor 80 to coil 54. Because of the voltage drop across resistance 76, the current reaching coil 54 is reduced. As explained above, this reduced current causes a magnetic field exerting a sufficient force on plunger 42 to overcome the force of spring 50 due to the proximity between plunger 42 and coil 54. The reduced current is insufficient, however, to damage solenoid 38 despite the fact that the solenoid is the intermittent duty type. When door 88 is closed and switch 86 opens, the solenoid is deenergized and spring 50 returns latch member 32 to the position illustrated.

This invention thus provides a latch mechanism for a vehicle seat back that automatically is electromagnetically operated, utilizing an intermittent duty solenoid of attractive size and cost, upon the opening of the vehicle door to enhance vehicle passenger comfort and convenience.

It is to be understood that this invention is not limited to the exact construction illustrated and described above, but that various changes and modifications may be made without departing from the spirit and scope of the invention as defined by the following claims.

We claim:
1. A seat back latch mechanism for a vehicle seat assembly having a substantially horizontal seat member and a seat back member pivotally secured to said seat member, cooperating latch means carried by each of said members for preventing movement of said seat back member relative to said seat member, the improvement comprising: said latch means including a stationary latch element on one of said members and movable latch element carried by the other of said members and having a first position engaging said stationary latch element for prevention of relative movement of said members and a second position remote from said stationary latch element, resilient means operatively secured to said movable latch element and exerting a force biasing said movable latch element into the first position, and motor means secured to said other member and operatively connected to said movable latch element and intermittently exerting a force overcoming the force exerted by said resilient means and urging said movable latch element into the second position.

2. The seat back latch mechanism of claim 1, wherein said one member is said seat member and said other member is said seat back member.

3. The seat back latch mechanism of claim 1, wherein said motor means operates electromagnetically.

4. The seat back latch mechanism of claim 3, wherein said electromagnetic means comprises an intermittent duty solenoid.

5. The seat back latch mechanism of claim 4, wherein said solenoid includes a ferromagnetic plunger movable between an extended position and retracted position and an electrically conductive coil electrically connected to a solenoid energizing circuit and a source of electrical energy, said circuit including means applying a first current across said coil when said plunger is in the extended position and applying a second current across said coil after said plunger has moved from the extended postion, said second current being less than said first current.

6. The seat back latch mechanism of claim 4, wherein said solenoid includes a ferromagnetic plunger movable between an extended position and a retracted position an electrically conductive coil connected in series circuit with a source of electrical energy and circuit energizing first switch means, and including second switch means in series circuit between said source of electrical energy and said coil and sensitive to the position of said plunger and having a closed position when said plunger is in the extended position and an open position when said plunger is in the retracted position, and an electrical resistance in series circuit between said source of electrical energy and said coil and in parallel circuit with said second switch means.

7. In a motor vehicle body having a passenger compartment, a body opening permitting access to said compartment, a door for said body opening having an open position and a closed position and a seat assembly mounted in said compartment and including a substantially horizontal seat member and a seat back member pivotally secured to said seat member for movement relative thereto, the improvement comprising: cooperating latch means on said members having an open position and a closed position wherein said members are locked against relative movement, yieldable means operatively connnected to said latch means and exerting a force urging the latter into the closed position, intermittently energizable motor means operatively connected to said latch means for urging said latch means against the force of said yieldable means into the open position, and door position sensitive control means energizing said motor means when said door is in the open position and deenergizing said motor means when the door is in the closed position.

8. The combination of claim 7, wherein said motor means is mounted on said seat back member and operates electromagnetically.

9. The combination of claim 7, wherein said motor means comprise an intermittent duty solenoid and said control means include a source of electrical energy and circuit means electrically connecting said source and said solenoid and initially applying a first current to said solenoid and subsequently applying a second current to said solenoid, and second current being less than said first current.

References Cited
UNITED STATES PATENTS

| | | | |
|---|---|---|---|
| 2,559,548 | 7/1951 | Seigneur | 296—63 |
| 2,815,796 | 12/1957 | Lobanoff | 296—68 |
| 2,829,002 | 4/1958 | Learengood, et al. | 296—65 |
| 3,157,433 | 11/1964 | Davis | 297—369 |
| 3,220,762 | 11/1965 | Garvey, et al. | 296—68 |
| 3,245,486 | 4/1966 | Oswald | 296—65 X |
| 3,353,868 | 11/1967 | Pigeon, et al. | 297—372 |

BOBBY R. GAY, *Primary Examiner.*

G. O. FINCH, *Assistant Examiner.*